Patented Jan. 24, 1950

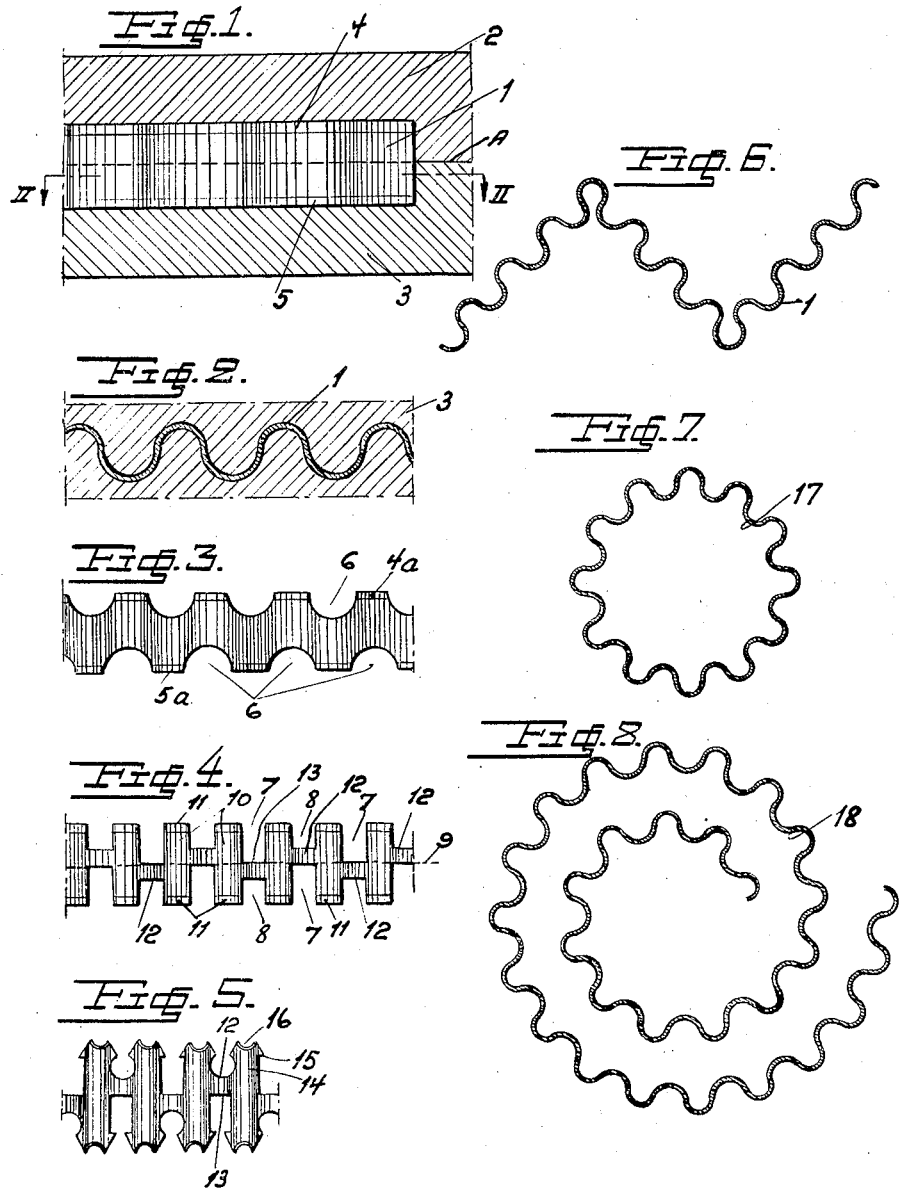

2,495,337

UNITED STATES PATENT OFFICE 2,495,337

INTERMEDIATE FRICTION LAYER FOR JOINING TWO OR MORE STRUCTURAL PARTS OF WOOD OR LIKE MATERIAL

Birger Lindham, Stockholm, Sweden

Application August 12, 1944, Serial No. 549,266
In Sweden October 27, 1943

2 Claims. (Cl. 85—14)

For joining together the wooden parts of wooden structures it is common practice to use intermediate friction layers and bolts. In such case, the bolts have the object of pressing the wooden parts against each other, but need not mediate the transmission of tractive or compressive forces in a direction at right angles to the bolt axes. This transmission of power is, instead, effected by the intermediate friction layers which are placed between the different wooden parts of the structure. The intermediate friction layers have often the shape of sheaves or disks provided with grooves or teeth. As a rule, the parts of the intermediate layers existing between these grooves or teeth cannot be brought to penetrate into the wood, for which reason the wooden parts will not bear completely against each other. Therefore, in a structure composed of boards or deals and kept together by bolts with appertaining intermediate sheaves it is not possible to complete the keeping together of the deals by gluing, unless special recesses are made for the sheaves, which, however, is expensive. This is a considerable disadvantage, since gluing is now more and more used for the attachment of structural parts of wood.

Another disadvantage of intermediate sheaves of common types is that those parts of the sheaves which are to penetrate into the wood, often have such a shape and thickness that they offer great resistance when being pressed into the wood. As a result, the bolts must be made comparatively coarse, which is unnecessary in view of the fact that they have only to fulfill the secondary function of keeping together the wooden parts contained in the structure. In many intermediate sheaves, moreover, the teeth or grooves have such a shape that they cause local crushing and destruction of the wood within the bearing surface proper and the space close thereto. This circumstance may imperil the transmission of power and is a serious source of insecurity.

According to the present invention these inconveniences are removed by making the intermediate layer of a corrugated band or strip of stiff material, one or both longitudinal edges of which are, on the whole of their length or at special projections, ground or thinned in some other manner, e. g. in the form of chisel-shaped edges. This strip, which consists, for instance, of steel, iron or other metal, if desired stainless, may have a comparatively slight thickness, the corrugation efficiently preventing the relatively thin strip from being bent down under the influence of the pressure. Due to the fact that the edges of the strip are ground into more or less sharp edges, which easily penetrate into the wood without crushing the fibers or deforming the structure, such penetration of the strip into the wood will be facilitated to a high degree.

Furthermore, this strip has no parts extending in the plane of the joint between the two wooden parts, so that these wooden parts may be brought to bear closely against each other, thus enabling gluing. The new intermediate layer is, therefore, more favourable than intermediate layers previously known.

The pressing operation proper may be effected in known manner, the intermediate friction layers being brought to penetrate into the wooden parts on both sides of the joint between these parts. Any required pressure at right angle to the bearing surfaces of the wooden parts may be maintained by screws, nails, bolts or rivets, and, besides, the surface of the joint may, as stated above, be glued in order to complete the keeping together of the parts.

In the accompanying drawing, Figure 1 shows a corrugated band or strip according to the invention arranged between two wooden parts placed close to each other. Figure 2 is a longitudinal section along the line II—II of Figure 1. Figures 3, 4 and 5 show some further embodiments of the strip according to the invention as viewed from the side, and Figures 6 to 8 show some examples of the strip bent into different shapes, as viewed in longitudinal section.

According to Figures 1 and 2 the intermediate friction layer consists of an iron or steel strip 1 corrugated transversely (see Figure 2) and having a suitable height and length as well as a relatively slight thickness, e. g. about 0.5 mm. This band is pressed to about half its height into each of the wooden parts 2, 3 on both sides of the joint surface A of said parts. The wooden parts 2, 3 are pressed closely against each other, for instance by means of a continuous bolt, nail, screw, or the like, arranged transversely to the joint surface A. In some cases I also use gluing to assist in attaching the parts 2, 3 to each other. The longitudinal edges 4, 5 of the strip are thinned, for instance by grinding, so that these edges obtain the shape of thin edges, thus facilitating the penetration into the wood.

Figures 1 and 2 show an embodiment in which the edges 4, 5 of the strip 1 are ground along the whole of their length. To further facilitate the penetration of the iron strip 1 into the wood 2, 3 and simultaneously diminishing the risk of its being cracked or damaged in some other way, the corrugated strip 1 may, however, according to Figure 3 be provided with recesses or notches 6. Between these notches the strip has projections 4a and 5a which are sharpened or ground to form an edge of chisel shape before or after the corrugation.

The recesses or notches may also be made in such a manner that the intermediate friction layer, owing to the stops formed by said recesses, is prevented from penetrating too far into the respective wooden parts, between which it is placed. Figure 4 shows a corrugated intermediate layer which has been given this property due to the fact that the recesses 7, 8 have different depths, so that only the first-mentioned recesses 7 extend to or approximately to the longitudinal symmetric line 9 of the strip, whereas the last-mentioned recesses 8 are not so deep. The edges 11 of the projections 10 formed are sharpened into thin edges. The projections may be pointed or they may have edges parallel to the longitudinal direction of the strip. In order to ensure that the intermediate layer penetrates about equally far into both wooden parts, it is preferable to sharpen the bottom edges 12 of the shallow recesses 8 into sharp edges, thus facilitating the penetration into the wood. On the other hand, the bottom edges 13 of the deep recesses 7 should not be sharpened, but have the obtuse form obtained in the punching, so that these edges will form efficient stops against too deep a penetration into the wood.

Figure 5 shows an embodiment in which the projections 14 of the corrugated strip are provided with barbs or hooks 15 for the purpose of better maintaining the strip in the wooden parts. The tops of the projections 14 may be ground off, as shown at 16.

For further preventing an intermediate friction layer of the type now referred to from being knocked down when the wooden parts are being pressed together, it may be suitable to bend the corrugated strip of iron into an angular shape (Figure 6), a ring 17, (Figure 7) or into the shape of a spiral 18 (Figure 8). This embodiment has also other advantages. Thus, the power transmitted by the intermediate layer will, in a suitable manner, be uniformly distributed over a larger surface. Further, the outer coils of the spiral will prevent the tendency to cracking which may be caused by the penetration of the spiral parts into the wood. Obviously, the spiral may also be so formed or shaped that its outer contour forms a four-sided or any other desirable figure instead of the round figure shown in Figure 8.

What I claim is:

1. An intermediate friction strip for joining structural parts of wood comprising a metal body formed with transverse corrugations, a plurality of sharp projections projecting in opposite directions from both longitudinal edges of said body and alternately deep and shallow recesses between said projections at both longitudinal edges of said body, the inner edges of the deep recesses forming shoulders acting to limit the introduction of the friction strip into the structural parts to a determined depth, said deep recesses extending substantially to the longitudinal symmetric line of said strip and the shallow recesses being spaced from said line.

2. An intermediate friction strip as claimed in claim 1 wherein the inner edges of the shallow recesses are formed to provide penetrating edges for entering the wood parts.

BIRGER LINDHAM.

REFERENCES CITED

The following references are of record in the file of this patent:

UNITED STATES PATENTS

| Number | Name | Date |
| --- | --- | --- |
| 805,212 | Litz | Nov. 21, 1905 |
| 1,045,591 | Muth | Nov. 26, 1912 |
| 1,169,124 | Cary | Jan. 25, 1916 |
| 1,380,362 | Cunningham | June 7, 1921 |
| 1,396,971 | Meyercord | Nov. 15, 1921 |
| 1,598,199 | Johansson et al. | Aug. 31, 1926 |
| 2,035,817 | Lloyd | Mar. 31, 1936 |
| 2,072,125 | Novick | Mar. 2, 1937 |
| 2,080,962 | Febrey | May 18, 1937 |
| 2,091,776 | Young | Aug. 31, 1937 |
| 2,152,183 | Fetterolf | Mar. 28, 1939 |
| 2,198,245 | Goss | Apr. 23, 1940 |

FOREIGN PATENTS

| Number | Country | Date |
| --- | --- | --- |
| 38,044 | Austria | July 26, 1909 |